United States Patent
Kim et al.

(10) Patent No.: US 12,446,103 B2
(45) Date of Patent: Oct. 14, 2025

(54) METHOD AND APPARATUS FOR SIDELINK DISCONTINUOUS RECEPTION (DRX) COMMUNICATION IN WIRELESS SYSTEMS

(71) Applicant: ELECTRONICS AND TELECOMMUNICATIONS RESEARCH INSTITUTE, Daejeon (KR)

(72) Inventors: Jun Hyeong Kim, Daejeon (KR); Go San Noh, Daejeon (KR); Il Gyu Kim, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 17/991,548

(22) Filed: Nov. 21, 2022

(65) Prior Publication Data

US 2023/0164874 A1 May 25, 2023

(30) Foreign Application Priority Data

Nov. 22, 2021 (KR) .................. 10-2021-0161541
Nov. 21, 2022 (KR) .................. 10-2022-0156538

(51) Int. Cl.
*H04W 76/28* (2018.01)
*H04B 17/318* (2015.01)
(Continued)

(52) U.S. Cl.
CPC .......... *H04W 76/28* (2018.02); *H04B 17/318* (2015.01); *H04W 24/08* (2013.01);
(Continued)

(58) Field of Classification Search
CPC ... H04W 76/28; H04W 72/40; H04W 72/566; H04W 24/08; H04W 72/04; H04W 52/02;
(Continued)

(56) References Cited

U.S. PATENT DOCUMENTS 11,160,033 B2 10/2021 Noh et al.
11,197,134 B2 12/2021 Lee et al.
(Continued)

FOREIGN PATENT DOCUMENTS

WO 2021/146940 A1 7/2021
WO WO 2021/250574 A1 * 12/2021
(Continued)

OTHER PUBLICATIONS

OPPO, "Discussion on power saving in NR sidelink communication", R1-2111300, 3GPP TSG RAN WG1 #107-e, e-Meeting, Nov. 11-19, 2021.

*Primary Examiner* — Rushil P. Sampat
(74) *Attorney, Agent, or Firm* — Rabin & Berdo, P.C.

(57) ABSTRACT

A method for sidelink DRX communication may configure a first resource sensing window for identifying whether resources of a candidate resource set to be used for sidelink DRX communication are reserved or used, identify whether the resources of the candidate resource set are reserved or used based on the first resource sensing window, determine a selected resource set based on a result of the identification, configure a second resource sensing window based on information on a DRX active time of a receiving terminal, which is received from the receiving terminal, identify whether the resources of the candidate resource set are reserved or used by another terminal based on the second resource sensing window, update the selected resource set based on a result of the identification on the second resource (Continued)

sensing window, and transmit data to the receiving terminal by using a resource of the updated selected resource set.

20 Claims, 9 Drawing Sheets

(51) Int. Cl.
  *H04W 24/08* (2009.01)
  *H04W 72/04* (2023.01)
  *H04W 72/40* (2023.01)
  *H04W 72/566* (2023.01)

(52) U.S. Cl.
  CPC ........... *H04W 72/04* (2013.01); *H04W 72/40* (2023.01); *H04W 72/566* (2023.01)

(58) Field of Classification Search
  CPC ..... H04W 72/02; H04W 72/25; H04W 76/14; H04W 92/18; H04B 17/318; Y02D 30/70
  See application file for complete search history.

(56) References Cited

U.S. PATENT DOCUMENTS

| | | | |
|---|---|---|---|
| 2021/0051587 | A1 | 2/2021 | Wu et al. |
| 2021/0212117 | A1 | 7/2021 | Chae et al. |
| 2021/0227465 | A1 | 7/2021 | Kung et al. |
| 2021/0329720 | A1 | 10/2021 | Balasubramanian et al. |
| 2022/0022279 | A1 | 1/2022 | Kim |
| 2023/0171740 | A1* | 6/2023 | Buthler ............. H04W 72/0446 370/329 |
| 2023/0224929 | A1* | 7/2023 | Zhang ................... H04W 72/02 370/329 |
| 2023/0345510 | A1* | 10/2023 | Zhang ............... H04W 72/0453 |
| 2023/0403681 | A1* | 12/2023 | Wen .................. H04W 52/0216 |
| 2023/0403729 | A1* | 12/2023 | Lu .......................... H04W 52/02 |
| 2024/0334534 | A1* | 10/2024 | Ko ........................ H04W 76/28 |
| 2024/0389117 | A1* | 11/2024 | Park ....................... H04W 76/28 |

FOREIGN PATENT DOCUMENTS

WO    WO 2022/062314 A1 * 3/2022
WO    WO 2022/233048 A1 * 11/2022

* cited by examiner

METHOD AND APPARATUS FOR SIDELINK DISCONTINUOUS RECEPTION (DRX) COMMUNICATION IN WIRELESS SYSTEMS

CROSS-REFERENCE TO RELATED APPLICATIONS

This application claims priority to Korean Patent Applications No. 10-2021-0161541, filed on Nov. 22, 2021, and No. 10-2022-0156538, filed on Nov. 21, 2022, with the Korean Intellectual Property Office (KIPO), the entire contents of which are hereby incorporated by reference.

BACKGROUND

1. Technical Field

Exemplary embodiments of the present disclosure relate to sidelink communication techniques in a wireless communication system, and more particularly, to techniques for reducing power consumption of a terminal operating in a resource allocation mode 2 in a sidelink communication environment.

2. Related Art

The Vehicle-to-Everything (V2X) communication technology is a communication technology for exchanging various information including traffic information with other vehicles and other infrastructures such as roads through wired/wireless networks. The V2X communication of the prior arts includes communication between vehicles (i.e., Vehicle-to-Vehicle (V2)), between vehicle and road infrastructure/network (i.e., Vehicle-to-Infrastructure/Network (V2I/N)), between vehicle and pedestrian (i.e., Vehicle-to-Pedestrian (V2P)), and/or the like. As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

SUMMARY

Exemplary embodiments of the present disclosure are directed to providing a method and an apparatus for reducing power consumption of terminals performing sidelink communication.

According to a first exemplary embodiment of the present disclosure, a method for sidelink discontinuous reception (DRX) communication, performed by a transmitting terminal, may comprise: configuring a first resource sensing window for identifying whether resources of a candidate resource set to be used for sidelink DRX communication are reserved or used; identifying whether the resources of the candidate resource set are reserved or used based on the first resource sensing window; determining a selected resource set based on a result of the identification; configuring a second resource sensing window based on information on a DRX active time of a receiving terminal, which is received from the receiving terminal; identifying whether the resources of the candidate resource set are reserved or used by another terminal based on the second resource sensing window; updating the selected resource set based on a result of the identification on the second resource sensing window; and transmitting data to the receiving terminal by using a resource of the updated selected resource set.

The identifying of whether the resources of the candidate resource set are reserved or used by another terminal may comprise: receiving signals transmitted through each resource of the first resource sensing window or the second resource sensing window; measuring a reference signal received power (RSRP) for each of the received signals; and determining a resource in which the measured RSRP is greater than or equal to a pre-configured threshold as a resource used by another terminal.

The configuring of the second resource sensing window may comprise: determining a predetermined number of resources as a maximum additional resource sensing window in the DRX inactive time of the transmitting terminal; and configuring the second resource sensing window so as to sense arbitrary resources within the maximum additional resource sensing window.

A size of the second resource sensing window may be determined based on a power state of the transmitting terminal.

When assistant information on the non-preferred resource is received from the receiving terminal, a sensing operation may be not performed in a position within the second resource sensing window associated with the non-preferred resource, wherein the assistant information is received through a media access control (MAC) control element (CE) or sidelink control information (SCI).

The method may further comprise: when the determined selected resource set has resources less than a pre-configured number, identifying whether the resources of the candidate resource set are reserved or used based on at least one of the first resource sensing window or the second resource sensing window until a number of resources determined by using one of two or more pre-configured threshold values is satisfied.

The method may further comprise: stopping the configuring of the second resource sensing window when a priority of transmission of the data, which is received from a higher layer, is lower than a pre-configured priority; and transmitting the data based on the selected resource set.

The method may further comprise: when a priority of transmission of the data, which is received from a higher layer, is higher than a pre-configured priority, configuring the second resource sensing window within the DRX inactive time of the transmitting terminal.

The method may further comprise: requesting a report on a non-preferred resource of the DRX active time of the receiving terminal; receiving information on the non-preferred resource of the DRX active time of the receiving terminal; and excluding the non-preferred resource of the DRX active time of the receiving terminal when updating the selected resource set.

According to a second exemplary embodiment of the present disclosure, a user equipment (UE) for sidelink communication may comprise: a processor; and a transceiver for communicating with at least one terminal, wherein the processor is executed to perform: configuring a first resource sensing window for identifying whether resources of a candidate resource set to be used for sidelink DRX communication are reserved or used; identifying whether the resources of the candidate resource set are reserved or used based on the first resource sensing window through the transceiver; determining a selected resource set based on a result of the identification; configuring a second resource sensing window based on information on a DRX active time of a receiving terminal, which is received from the receiving terminal; identifying whether the resources of the candidate resource set are reserved or used by another terminal based on the second resource sensing window through the transceiver; updating the selected resource set based on a result of the identification on the second resource sensing window; and transmitting data to the receiving terminal through the transceiver by using a resource of the updated selected resource set.

The processor may be further executed to perform: receiving signals transmitted in each resource of the first resource sensing window or the second resource sensing window through the transceiver; measuring a reference signal received power (RSRP) for each of the received signals through the transceiver; and determining a resource in which the measured RSRP is greater than or equal to a pre-configured threshold as a resource used by another terminal.

In the configuring of the second resource sensing window, the processor may be further executed to perform: determining a predetermined number of resources as a maximum additional resource sensing window in the DRX inactive time of the transmitting terminal; and configuring the second resource sensing window so as to sense arbitrary resources within the maximum additional resource sensing window.

A size of the second resource sensing window may be determined based on a power state of the transmitting terminal.

When assistant information on the non-preferred resource is received from the receiving terminal, a sensing operation may be not performed in a position within the second resource sensing window associated with the non-preferred resource, wherein the assistant information is received through a media access control (MAC) control element (CE) or sidelink control information (SCI).

The processor may be further executed to perform: when the determined selected resource set has resources less than a pre-configured number, identifying whether the resources of the candidate resource set are reserved or used based on at least one of the first resource sensing window or the second resource sensing window until a number of resources determined by using one of two or more pre-configured threshold values is satisfied.

The processor may be further executed to perform: stopping the configuring of the second resource sensing window when a priority of transmission of the data, which is received from a higher layer, is lower than a pre-configured priority; and transmitting the data based on the selected resource set.

The processor may be further executed to perform: when a priority of transmission of the data, which is received from a higher layer, is higher than a pre-configured priority, configuring the second resource sensing window within the DRX inactive time of the transmitting terminal.

The processor may be further executed to perform: requesting a report on a non-preferred resource of the DRX active time of the receiving terminal; receiving information on the non-preferred resource of the DRX active time of the receiving terminal; and excluding the non-preferred resource of the DRX active time of the receiving terminal when updating the selected resource set.

According to a third exemplary embodiment of the present disclosure, a method for sidelink discontinuous reception (DRX) communication, performed by a receiving terminal, may comprise: receiving, from a transmitting terminal, a request message for requesting a report on a non-preferred resource within a DRX inactive time or within the DRX inactive time and a DRX active time; identifying the non-preferred resource within the DRX inactive time or within the DRX inactive time and the DRX active time, from a response to the request message; and transmitting, to the transmitting terminal, information on the identified non-preferred resource within the DRX inactive time or the identified non-preferred resource within the DRX inactive time and the DRX active time.

The request message may include information on a start time and an end time of the DRX inactive time.

According to the exemplary embodiments of the present disclosure, power consumption of a terminal operating in the resource allocation mode 2 in a sidelink communication environment can be reduced.

DETAILED DESCRIPTION OF THE EMBODIMENTS

Figure 1:
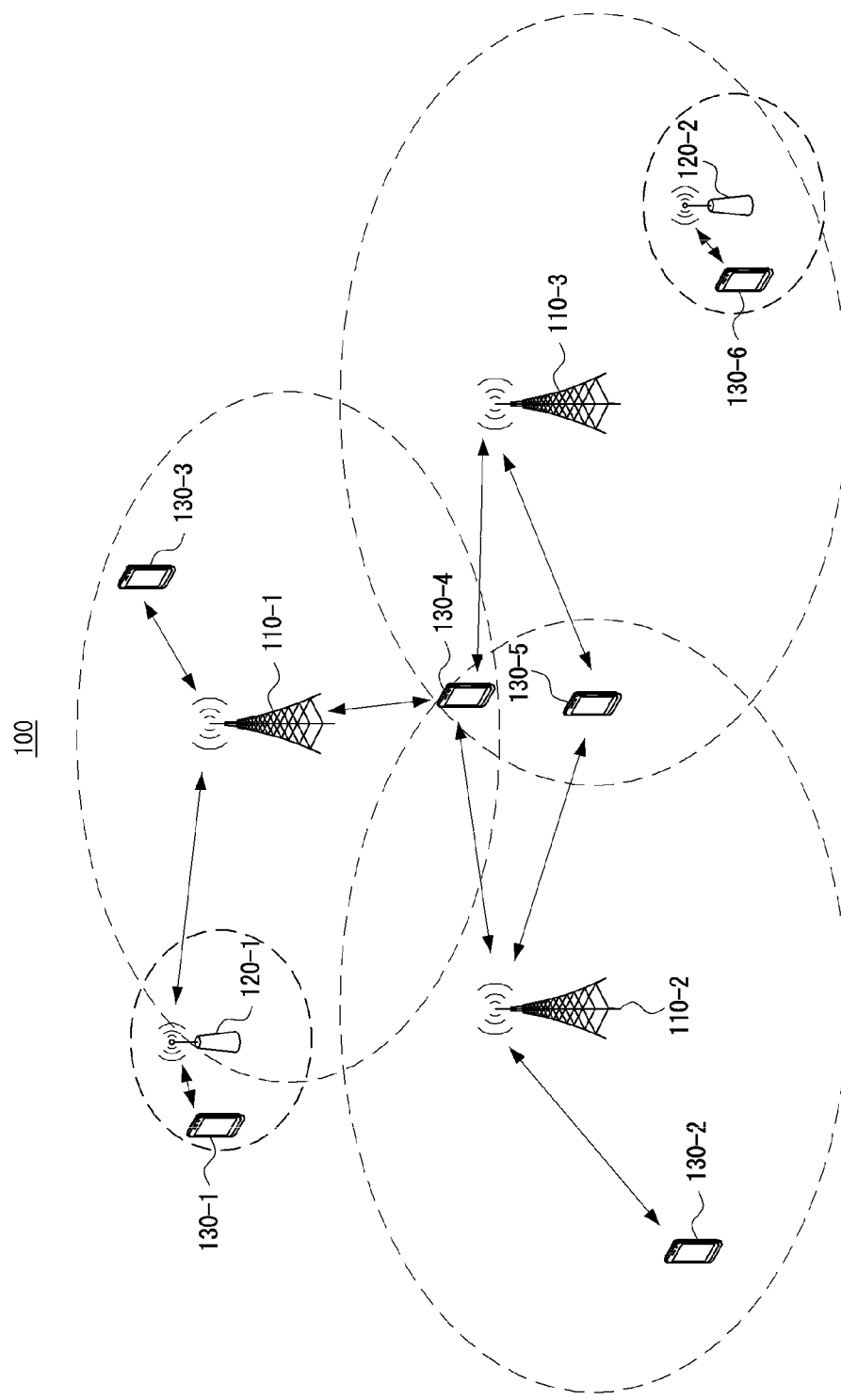
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
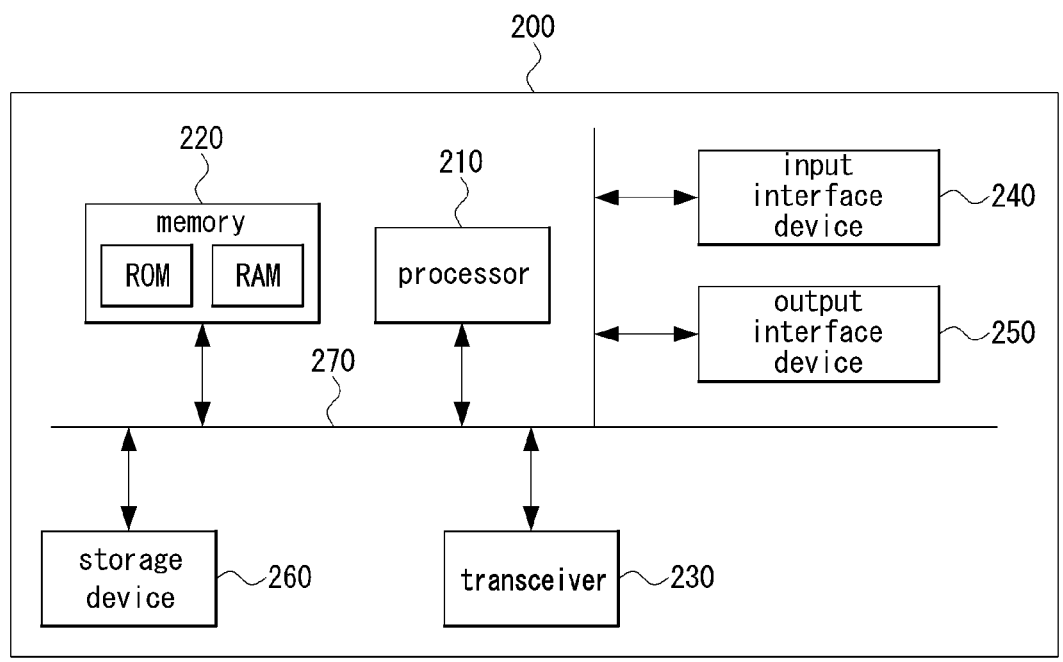
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for sidelink communication will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3:
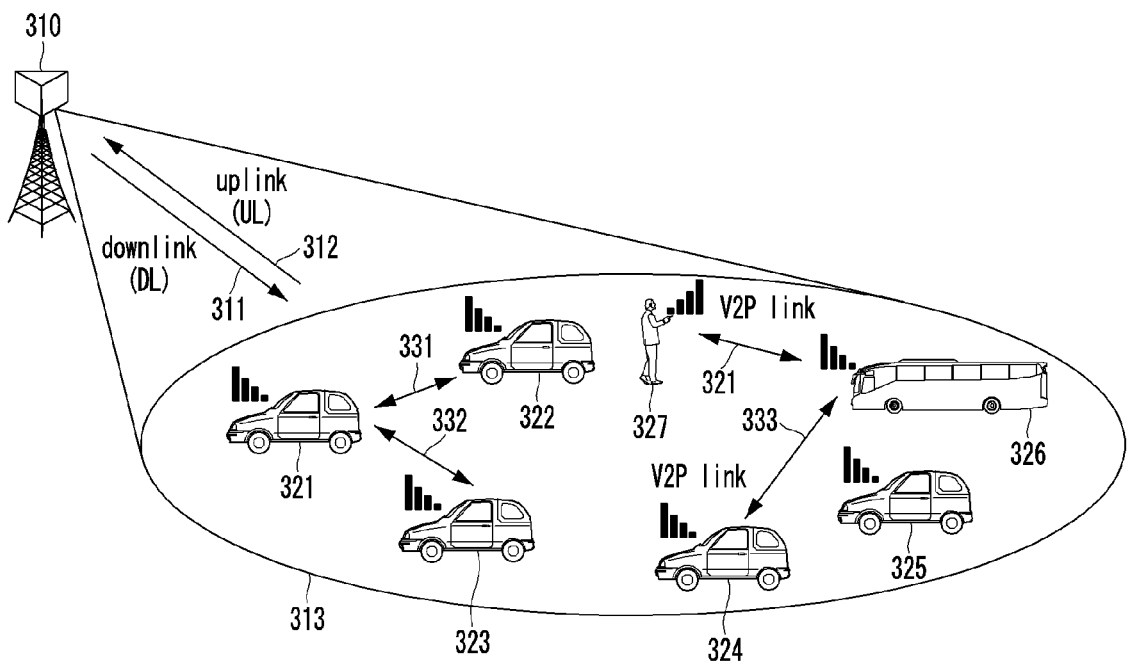
FIG. 3 is a conceptual diagram for describing V2X communication.

FIG. 3 is a conceptual diagram for describing V2X communication.

Referring to FIG. 3, a base station 310 and a communication coverage 313 of the base station are illustrated. Terminals 321, 322, 323, 324, 325, 326, and 327 may be included in the communication coverage 313 of the base station 310. The base station 310 may transmit data and/or signals to at least one of the terminals 321, 322, 323, 324, 325, 326, and 327 within the communication coverage 313 through a downlink 311. In addition, at least one terminal within the communication coverage 313 of the base station 310 may transmit data and/or signals through an uplink 312. The communication between the base station 310 and the vehicles may be specifically referred to as 'vehicle-to-infrastructure/network (V2I/N) communication'.

In addition, each terminal of FIG. 3 may perform sidelink communication. Terminals mounted on (i.e., on-board terminals) or terminals of users within the vehicles may communicate with each other. The communication therebetween may be referred to as 'vehicle-to-vehicle (V2V) communication'. FIG. 3 illustrates V2V links 331, 332, and 333.

In addition, communication between a vehicle and a pedestrian (i.e., a communication device carried by the pedestrian) may be performed. Here, the pedestrian may mean a user terminal that moves at a lower speed than a vehicle, and may mean a terminal of a user that moves using a bicycle as well as a user who moves on foot. The communication therebetween may be referred to as 'vehicle-to-pedestrian (V2P) communication'.

The V2I/N, V2V, and V2P communications described above are collectively referred to as 'vehicle-to-everything (V2X) communication'. That is, the V2X may be a communication technology that exchanges various information including traffic information with other vehicles and other infrastructures such as roads through wired/wireless networks.

As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

Meanwhile, in various wireless communication systems including the 3GPP 4G Long Term Evolution (LTE) system, 'device-to-device (D2D)' communication scheme has been adopted to support various wireless communication services such as the V2X service. In the D2D communications scheme, terminals directly communicate with each other without going through network node(s). In the case of 3GPP, a direct communication link between terminals is defined as a sidelink. In the case of LTE, communication between terminals through a sidelink is possible even when out of network coverage. The LTE sidelink has been first standardized for D2D communication in LTE Release-12. Thereafter, there have been many standardization efforts in the 3GPP to improve the sidelink to be suitable for V2X communication.

In June 2018, the 3GPP has completed the 5G New Radio (NR) Release-15 specifications, and started standardizing NR V2X, 3GPP V2X phase 3, from the RAN1#94 meeting in August 2018. In addition to the existing LTE-based V2X services, the NR V2X is directed to supporting improved V2X services and supplementing the LTE V2X services rather than replacing the services provided by the LTE V2X by interworking with the LTE V2X. In this reason, the NR V2X should satisfy higher requirements than those of the LTE V2X. Currently, the NR V2X standardization is in progress by focusing primarily on sidelink design. As described above, the sidelink is a communication link that can directly exchange data packets between terminals without going through a network. That is, the sidelink may include the V2V link and the V2P link as described by way of example in FIG. 3. In addition, the V2I link between the vehicle and the infrastructure supporting functions of the terminal also corresponds to a sidelink. The NR V2X has introduced unicast and groupcast-based sidelink communications to support more diverse V2X services in addition to broadcast-based sidelink communication mainly provided by the LTE V2X. For example, in the NR V2X system, messages may be directly exchanged between terminals through unicast communication, and a terminal within or outside a group may deliver a message to terminals formed as the group through groupcast communication.

Meanwhile, the NR V2X supports a resource allocation mode 2, which is a scheme of communicating only through sidelinks without control of a base station. The most core technology in supporting the resource allocation mode 2 may be a resource sensing method and a resource selection method for sidelink resources allocated to a terminal.

Figure 4:
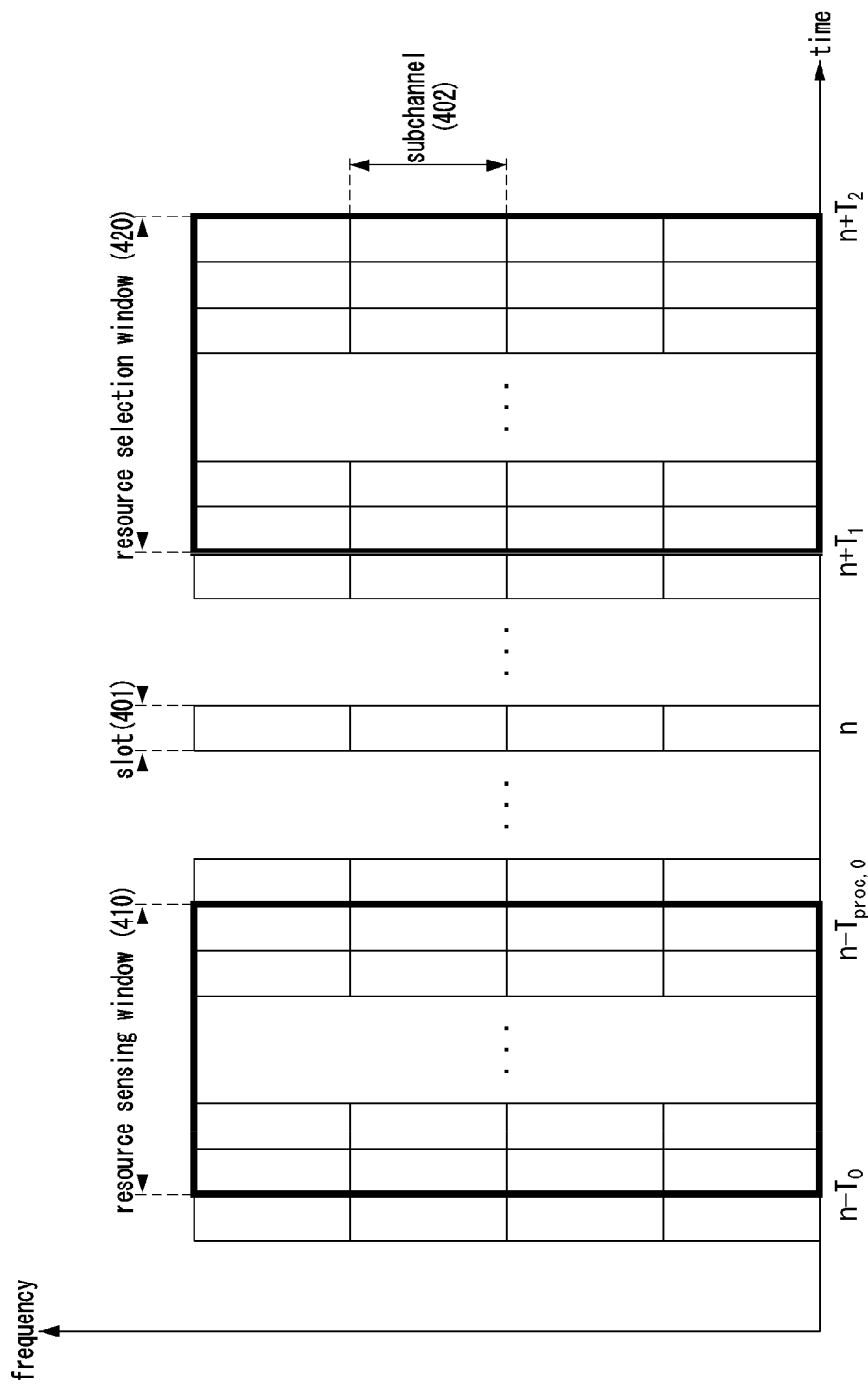
FIG. 4 is an exemplary diagram for describing a resource sensing window and a resource selection window configured in a terminal operating in the resource allocation mode 2 of NR V2X.

FIG. 4 is an exemplary diagram for describing a resource sensing window and a resource selection window configured in a terminal operating in the resource allocation mode 2 of NR V2X.

A sidelink resource pool in which transmission and reception is performed may be composed of slot(s) (e.g., 401) in the time domain and subchannel(s) (e.g., 402) in the frequency domain. FIG. 4 illustrates an example in which a terminal operating in the resource allocation mode 2 receives a resource selection trigger in a slot n. When a resource selection operation is triggered in the slot n, the terminal may sense resources in slots of a time period corresponding to a resource sensing window 410. In FIG. 4, a time period of $[n-T_0, n-T_{proc,0}]$ is exemplified as an example of the time period sensed according to the resource sensing window 410. The terminal may select a resource for transmission within a time period corresponding to a resource selection window 420 based on the result of sensing the resources in the resource sensing window 410. In FIG. 4, a time period of $[n+T_1, n+T_2]$ is exemplified as an example of the time period of the resource selection window 420.

Figure 5:
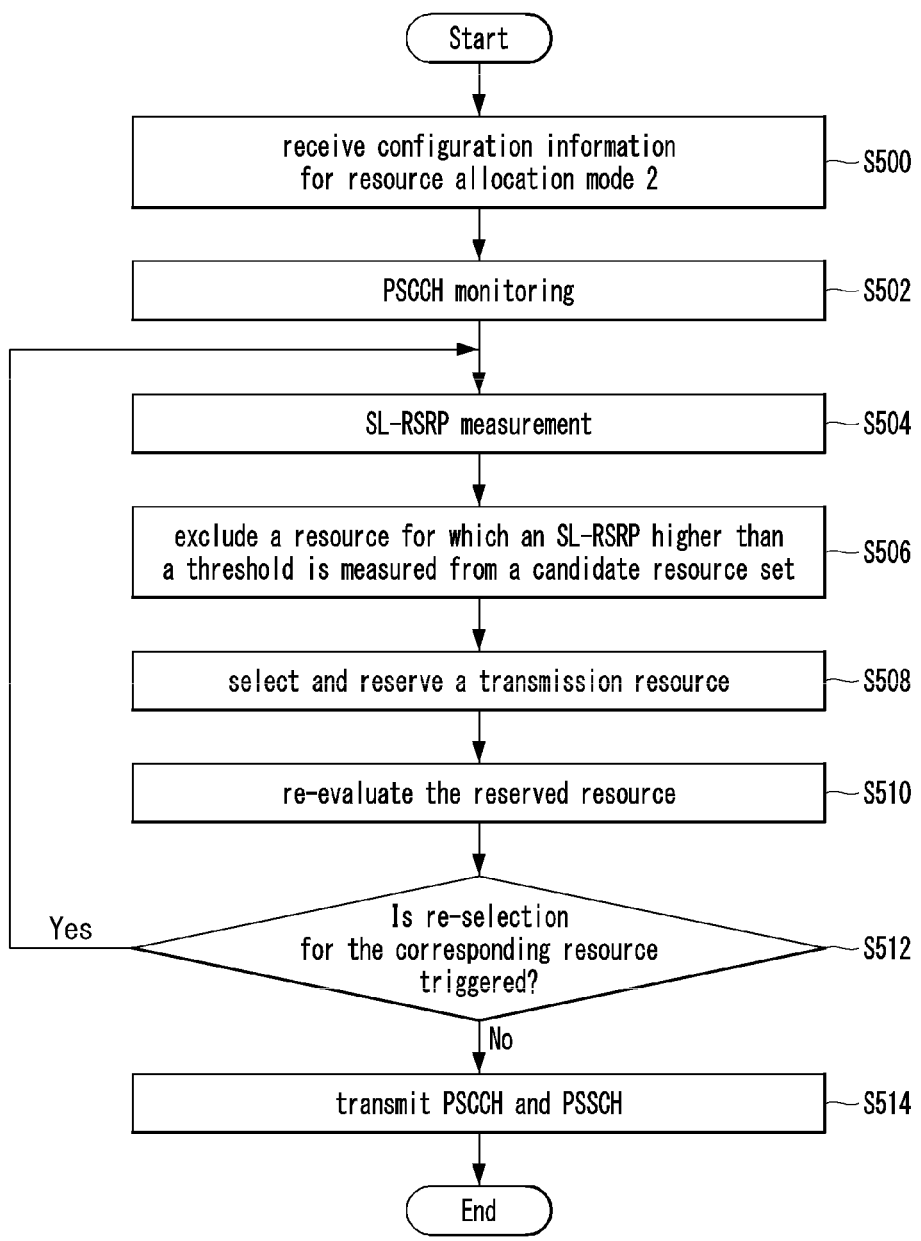
FIG. 5 is a flowchart for sidelink communication in a terminal operating in the sidelink resource allocation mode 2.

FIG. 5 is a flowchart for sidelink communication in a terminal operating in the sidelink resource allocation mode 2.

Referring to FIG. 5, the terminal may receive various configuration information for the resource allocation mode 2 from a higher layer (S500). The configuration information may include various parameters required for resource selection and resource sensing, such as resource pool configuration information, priority information, data packet delay budget (PDB) information, resource reservation interval information, candidate resource set information, resource selection window size information, resource sensing window size information, reference signal received power (RSRP) threshold information, and/or the like.

The terminal may continuously perform monitoring on a physical sidelink control channel (PSCCH) corresponding to a sidelink control channel (S502).

The terminal may measure RSRPs of a demodulation reference signal (DMRS) of the PSCCH detected from the monitoring and a DMRS of a physical sidelink shared channel (PSSCH), which is a sidelink data channel scheduled by the PSCCH (S504).

The terminal may exclude a resource for which an RSRP higher than the threshold received through the configuration information is measured from a preconfigured candidate resource set (S506).

The terminal may select and reserve a resource to be used for transmission from among remaining resources in the candidate resource set except for the excluded resource(s) (S508).

The terminal may re-evaluate the reserved resource (S510).

The terminal may determine whether re-selection for the resource is triggered (S512). As a result of the determination in step S512, if re-selection of the resource to be used for transmission is triggered, the terminal may perform the procedure again from step S504. On the other hand, if it is determined in step S512 that re-selection of the resource to be used for transmission is not triggered, the terminal may transmit a PSCCH and a PSSCH using the resource as it is (S514).

Meanwhile, when the resource selection procedure is triggered in the slot n for the terminal operating in the resource allocation mode 2 in the sidelink-based communication system, the terminal may perform the resource selection procedure according to the following steps. The resource selection procedure described here will be described based on the contents described in the section 8.1.4 of TS 38.214, which is the 3GPP technical specification.

Step 1: Determine a candidate resource set $R_{x,y}$. Here, $R_{x,y}$ may be defined as consecutive $L_{subCH}$ subchannels starting from the $t_y$-th slot in the time domain and the x-th subchannel in the frequency domain within a resource pool configured to the terminal. That is, in the frequency domain, it may comprise subchannels x, x+1, x+2, . . . , and x+$L_{subCH}$. The terminal may determine the candidate resource set corresponding to $R_{x,y}$ existing in the resource pool within the time period corresponding to the resource selection window 420, that is, the entire time $[n+T_1, n+T_2]$. In this case, $T_1$ and $T_2$ may be defined as follows.

$T_1$ may be a value that satisfies '$0 \leq T_1 \leq T_{proc,1}$', and may be determined according to an implementation of the terminal. Here, $T_{proc,1}$ may be defined according to a subcarrier spacing as shown in Table 1 below.

TABLE 1

| $\mu_{SL}$ | $T_{proc,1}$ [slots] |
|---|---|
| 0 | 3 |
| 1 | 5 |
| 2 | 9 |
| 3 | 17 |

If a value of $T_{2min}$ is smaller than a remaining packet delay budget (PDB), a value of $T_2$ may be determined according to an implementation of the terminal as a value satisfying '$T_{2min} \leq T_2 \leq$ remaining PDB'. If the value of $T_{2min}$ is greater than or equal to the remaining PDB, the value of $T_2$ may be determined as the remaining PDB.

The number of candidate resources within the candidate resource set determined through Step 1 described above may be defined as $M_{total}$.

Step 2: Determine the resource sensing window 410. The resource sensing window 410 may be defined as $[n-T_0, n-T_{proc,0}^{SL}]$, where $T_0$ may correspond to a value set by a parameter sl-SwnsingWindow from the higher layer, and $T_{proc,0}^{SL}$ may be defined according to the subcarrier spacing as shown in Table 2 below.

TABLE 2

| $\mu_{SL}$ | $T_{proc,0}^{SL}$ [slots] |
|---|---|
| 0 | 1 |
| 1 | 1 |
| 2 | 2 |
| 3 | 4 |

The terminal may monitor a PSCCH in the slots corresponding to the resource pool within the resource sensing window 410 as described in steps S502 and S054 of FIG. 5 above, and may measure RSRPs of the PSCCH and a PSSCH corresponding thereto. In this case, a resource used by the terminal for its transmission within the resource sensing window 410 may be excluded from the sensing.

Step 3: The terminal may determine an initial threshold parameter Th($p_i$, $p_j$). The value of Th($p_i$, $p_j$) may be determined as the i-th value configured using a parameter sl-ThresPSSCH-RSRP-List, and in this case, i may be defined as i=$p_i$+($p_j$−1)*8.

Step 4: The terminal may initialize a resource set $S_A$. In this case, $S_A$ may be initialized with all possible candidate resources $R_{x,y}$.

Step 5: The terminal may exclude candidate resources $R_{x,y}$ satisfying the following conditions from the resource set $S_A$.

Condition 1: Slot $t'^{SL}_m$ which has not been monitored by the terminal in Step 2

Condition 2: When it is assumed that a first SCI format (or SCI format 1-A) is received in the slot $t'^{SL}_m$ that the terminal has not monitored, and slots all sub-channels within the resource pool, which correspond to an arbitrary period value indicated by a 'Resource reservation period' field of the first SCI format among period values set by a higher layer parameter sl-ResourceReservePeriodList, are resource-allocated, a case where a condition c of Step 6 to be described below is satisfied Step 6: The terminal may exclude the candidate resources $R_{x,y}$ satisfying the following condition from the resource set $S_A$.

Condition a: The terminal receives the first SCI format in the slot $t'^{SL}_m$, the 'Resource reservation period' field of the first SCI format indicates a value of $P_{rsvp\_RX}$, and a 'Priority' field thereof indicates a $prio_{RX}$.

Condition b: An RSRP value measured for the first SCI format is greater than Th ($prio_{RX}$, $prio_{TX}$).

Condition c: Resources overlapping with the candidate resources $R_{x,y+j\times P'_{rsvp\_TX}}$ (j=0, 1, . . . , $C_{resel-1}$) among slots and a set of resource blocks determined by the first SCI format received in the slot $t^{SL}_m$ or the first SCI format that is considered to be received in a slot $t^{SL}_{m+q\times P'_{rsvp\_RX}}$ (q=1, 2, . . . , Q) according to the period value indicated by the 'Resource reservation period' field. Here, Q is defined as $$Q = \left\lceil \frac{T_{scal}}{P_{rsvp\_RX}} \right\rceil,$$

and $T_{scal}$ corresponds to a value obtained by converting the length of the resource selection window 420, $T_2$, in milliseconds (msec).

Step 7: If the number of remaining candidate resources in the resource set $S_A$ is less than $X \cdot M_{total}$, the terminal may increase the value of $Th(p_i, p_j)$ by 3 dB, and may perform the procedure again from Step 4.

The terminal may report the resource set $S_A$ determined through the above procedure to the higher layer.

If a resource $r_i$ in ($r_0, r_1, r_2, \ldots$), which is a target resource for re-evaluation, is not included the resource set $S_A$, the terminal may report re-evaluation of the corresponding resource $r_i$ to the higher layer.

If a resource $r'_i$ in ($r'_0, r'_1, r'_2, \ldots$), which is a target resource for pre-emption, is excluded according to Step 6 above, is not included in the resource set $S_A$, and satisfies at least one of the following conditions, the terminal may report pre-emption of the resource $r'_i$ to the higher layer.

Condition 1: A parameter sl-PreemptionEnable is set to 'enable' and '$prio_{TX}$>$prio_{RX}$' is satisfied Condition 2: When the parameter sl-PreemptionEnable is set but not set to 'enable', and both '$prio_R X$<$prio_{pre}$' and '$prio_{TX}$>$prio_{RX}$' are satisfied The method described above will be described with reference to FIG. 6.

Figure 6:
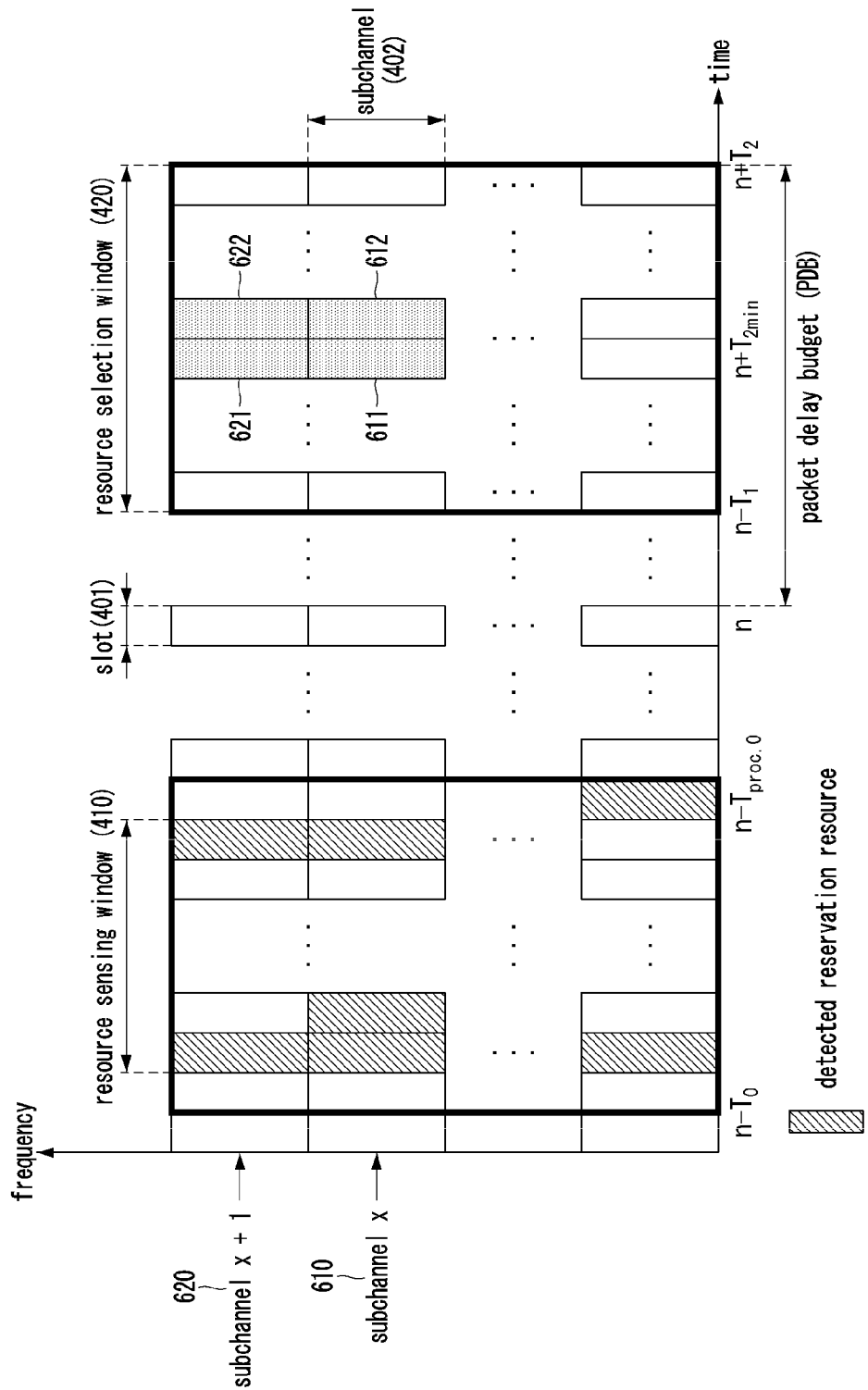
FIG. 6 is an exemplary diagram for describing a resource sensing procedure and a resource selection procedure in a terminal operating in the resource allocation mode 2.

FIG. 6 is an exemplary diagram for describing a resource sensing procedure and a resource selection procedure in a terminal operating in the resource allocation mode 2.

When two subchannels (i.e., $L_{subCH}$ is set to 2) starting from the x-th subchannel in the frequency domain are configured as described in Step 1, subchannels corresponding to a subchannel x 610 and a subchannel x+1 620 may be configured. In addition, the time period [n+$T_1$, n+$T_2$] of the resource selection window 420 may be determined as described above. That is, frequency resources within the resource selection window may be the subchannel x 610 and the subchannel x+1 620, and the time period of the resource selection window 420 may be determined. When the resources are specified in this manner, $M_{total}$, which is the number of candidate resources in the candidate resource set, may be determined.

Next, since the time period of the resource sensing window 410 may be determined by $T_0$ determined based on the value set by the parameter sl-SwnsingWindow from the higher layer and $T_{proc,0}^{SL}$ defined according to the subcarrier spacing as described in Step 2, the resource sensing window 410 may be determined.

When the resource sensing window 410 is determined, the terminal may monitor a PSCCH from resources within the resource sensing window 410, and measure RSRPs for the PSCCH and a PSSCH corresponding thereto. If the PSCCH and/or PSSCH is detected, it may be confirmed that the corresponding resource is a reserved resource for use by another terminal. Therefore, the resource confirmed to be used by another terminal may be identified as a 'detected reservation resource' in FIG. 6.

For the resource set $S_A$ initialized in Step 4 for the terminal to select resources, the terminal may exclude the above-described resources including the detected reservation resource not monitored in Step 2. After excluding all resources to be excluded from the resource set $S_A$ based on the methods described above, the resource set $S_A$ may be configured only with the resources 611, 612, 621, and 622 that can be actually used for transmission. Accordingly, the terminal may perform sidelink communication using at least one of the remaining resources in the resource set $S_A$.

Here, when the resource set $S_A$ is configured only with the actually-transmittable resources 611, 612, 621, and 622, the candidate resource sets $R_{x,y}$ and $R_{x,y+1}$ may be configured as follows. $R_{x,y}$ may include the resource 611 of the subchannel x 610 in the slot $t'^{SL}_y$ and the resource 621 of the subchannel x+1 620 in the slot $t'^{SL}_y$, and $R_{x,y+1}$ may include the resource 612 of the subchannel x 610 in the slot $t'^{SL}_{y+1}$ and the resource 622 of the subchannel x+1 620 in the slot $t'^{SL}_{y+1}$.

Since the terminal performing the resource sensing and resource selection procedures described above has to continuously perform PSCCH monitoring for resource sensing and RSRP measurements for PSCCH/PSSCH, power consumption thereof may occur significantly.

In the present disclosure described below, an additional procedure required when a resource sensing method, which is being considered as a method for reducing power consumption of the terminal operating in the resource allocation mode 2, is applied to sidelink discontinuous reception (DRX) operations will be described.

Prior to the description of the operation of the present disclosure, the resource sensing methods described in the present disclosure are briefly summarized as follows.

(1) Full Sensing: A method of performing resource sensing for the entire time period corresponding to a specific sensing period (2) Partial Sensing: A method of performing resource sensing for a partial time period within a time period corresponding to a specific sensing period
(3) Periodic-based Partial Sensing (PBPS): A method of periodically performing resource sensing for a partial time period within a time period corresponding to a specific sensing period
(4) Contiguous Partial Sensing (CPS): A method of continuously performing resource sensing within a time period corresponding to a specific sensing period Meanwhile, according to the content agreed at the 3GPP RAN1#106-e meeting, it was agreed to allow PSCCH reception and RSRP measurement for sensing even during a sidelink (SL) DRX inactive time. However, it was not decided at the meeting whether the sensing operation of the terminal, which is performed during the SL DRX inactive time, is specified in the specification or left to the terminal's own implementation without specification in the specification. In addition, according to the content additionally agreed at the 3GPP RAN1#107-e meeting, it was agreed that a physical (PHY) layer of the transmitting terminal selects at least a subset $S_A$ of candidate resources within the DRX active time of the receiving terminal, and reports it to select a medium access control (MAC) layer of the terminal.

Since the subset $S_A$ of candidate resources that the PHY layer of the transmitting terminal should report to the MAC layer may be restricted to a DRX active time of the receiving terminal, a case where the subset $S_A$ of candidate resources that should be reported to the MAC layer of the terminal has resources less than a pre-configured threshold $X \cdot M_{total}$ may occur.

In the present disclosure, one of the following two methods may be used to solve the above-described problem.

[Method 1]

In order to solve the-above described problem, the higher layer (MAC layer or RRC layer) of the transmitting terminal may inform the PHY layer of a set of $\alpha$ values in ascending order $(\alpha_1, \alpha_2, \ldots, \alpha_N)$, which is multiplied to the threshold, together with the DRX active time of the receiving terminal. Here, each value of the set of $\alpha$ values to be multiplied to the threshold may have a relationship of '$0<\alpha_1<\alpha_2<\ldots<\alpha_N \leq 1$', and N may have a value of 1 or more. The transmitting terminal may perform Step 7 of the above-described resource selection procedure in consideration of the threshold $(\alpha \cdot X \cdot M_{total})$ to which the $\alpha$ value informed by the higher layer is applied. For example, if the higher layer informs the PHY layer of the terminal of $\{\alpha_1=0.5, \alpha_2=1\}$, when performing Step 7 of the resource selection procedure, the threshold value $(\alpha_2 \cdot X \cdot M_{total})$ to which $\alpha_2=1$ is applied may be used first, and Steps 4 to 7 may be repeated by increasing the Th$(p_i, p_j)$ value by 3 dB. After completion of the execution, if the number of selected resources in the set $S_A$ does not exceed the threshold $(\alpha_2 \cdot X \cdot M_{total})$, the procedure may be re-performed using the threshold value $(\alpha_1 \cdot X \cdot M_{total})$ to which $\alpha 1$ is applied, and the final $S_A$ may be obtained and reported to the higher layer of the terminal. In this case, the value of $\hat{\alpha}=\alpha_1$ used in the resource selection procedure may also be informed.

[Method 2]

As in Method 1 above, instead of notifying the set of applicable $\alpha$ values by the higher layer, the minimum value $\alpha_{min}$ and the maximum value $\alpha_{max}$ of $\alpha$ may be informed to the PHY layer. In this case, the PHY layer may freely select several values between them to select the set $S_A$ in the same manner as in Method 1, and may report the selected set $S_A$ to the higher layer together with $\alpha_{min} \leq \hat{\alpha} \leq \alpha_{max}$ used in the selection of the final $S_A$.

Figure 7:
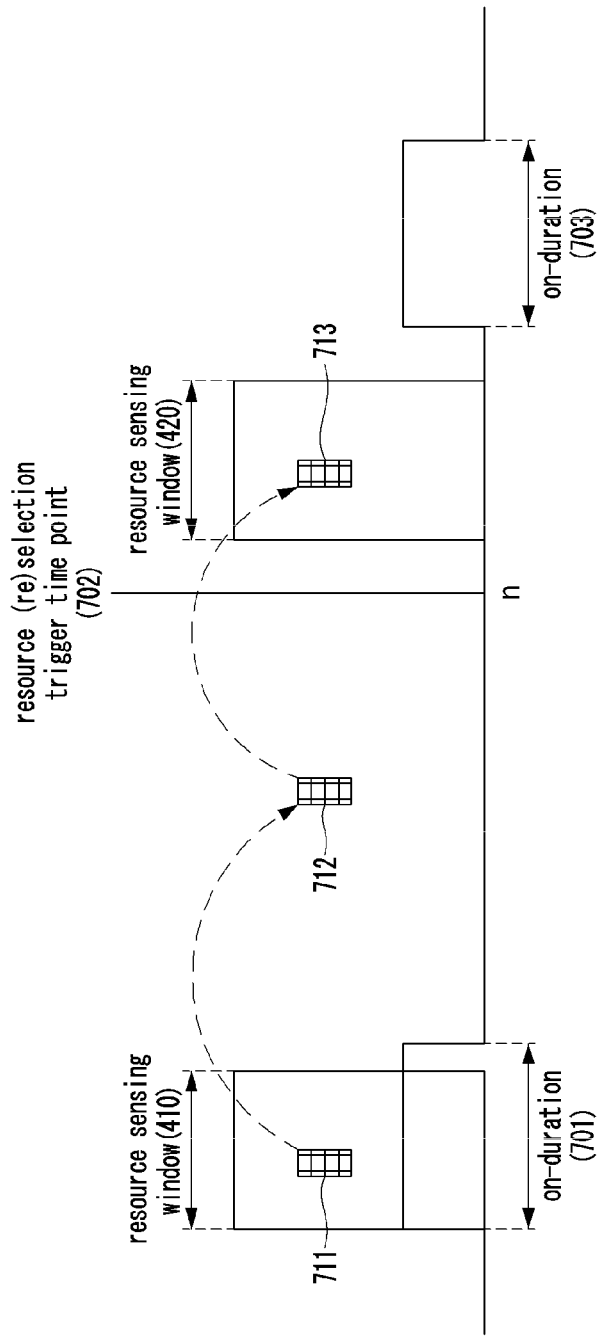
FIG. 7 is an exemplary diagram for describing a case where resource selection is triggered by a higher layer in a slot n within a DRX inactive time.

FIG. 7 is an exemplary diagram for describing a case where resource selection is triggered by a higher layer in a slot n within a DRX inactive time.

Specifically, FIG. 7 may illustrates an example of a sensing operation for a case where resource selection is triggered by the higher layer in the slot n within the DRX inactive time, and sensing cannot be performed during the DRX inactive time.

Referring to FIG. 7, for a terminal performing sidelink DRX operations, each of on-duration periods 701 and 703 may be a DRX active time, and the resource sensing window 410 may be activated in each of the on-duration periods 701 and 703. Accordingly, the terminal performing sidelink DRX operations may configure a specific resource A 711 as a candidate resource to be used for sidelink communication by using the resource sensing window 410 in the first on-duration period 710. In addition, when resource selection is triggered at a resource selection trigger time point 702, a specific resource C 713 may be selected from a candidate resource set configured in the resource selection window 420. Here, the resource A and the resource C may be resources of the same subchannel, and may be resources of the same location within a specific period. For example, it is assumed that the resource A is an a-th slot resource in a period of t−2 based on the trigger time point among the periods repeated in the subchannel x 610. Then, the resource C may be the a-th slot resource in the immediately next period from the trigger time point among the periods repeated in the subchannel x 610.

In this case, the corresponding resource may be used by another terminal in the inactive time of the sidelink DRX terminal. For example, another terminal may use a resource B 712 which is the a-th slot resource in the period of t−1 based on the trigger time point among the periods repeated in the subchannel x 610. In this case, there may be a problem that the sidelink DRX terminal cannot detect that another terminal uses the resource B.

This phenomenon may occur because the terminal cannot perform sensing within the sidelink DRX inactive time. That is, the resource sensing window 410 of the terminal may be limited only in the DRX on-duration period, and thus the following several problems may occur.

First, as described above with reference to FIG. 7, there may be a problem that a sensing result may not be accurate. This is because the resource sensing window 410 is limited in the DRX on-duration period, the terminal cannot obtain the most recent sensing result before the resource selection window 420. Therefore, as the resource sensing window 410 is close to the resource selection window 420, a more accurate sensing result may be obtained.

For example, a terminal that does not perform sidelink DRX operations may detect that another terminal using the resource A reserves the resource B. However, since the terminal in the sidelink DRX state does not perform sensing within the DRX inactive time, a detection result for the resource B cannot be obtained. Therefore, the terminal in the sidelink DRX state cannot determine whether the resource C within the resource selection window 420 is reserved. In addition, the terminal in the sidelink DRX state cannot perform contiguous partial sensing for resource selection because the resource selection window 420 is located within the DRX inactive time. Due to this, there may be a problem in that collision with aperiodic traffic cannot be avoided.

Second, there may be a problem that re-evaluation/pre-emption cannot be applied. As illustrated in FIG. 7, when the resource C is selected within the resource selection window 420, if the terminal does not perform sensing within the sidelink DRX inactive time, re-evaluation/pre-emption cannot be performed. Due to this, a packet reception ratio (PRR) performance may be deteriorated.

In order to solve the problem described above, as agreed in the 3GPP RAN1#106-e meeting, it may be advantageous to the sidelink performance to enable sensing to be performed even during the DRX inactive time to obtain an accurate sensing result. However, in the DRX operation, which aims to reduce power consumption, excessive sensing during the inactive time goes against the fundamental purpose of the DRX operation, so an appropriate sensing method is required. Therefore, the present disclosure proposes the following methods.

[Method 3]

Figure 8:
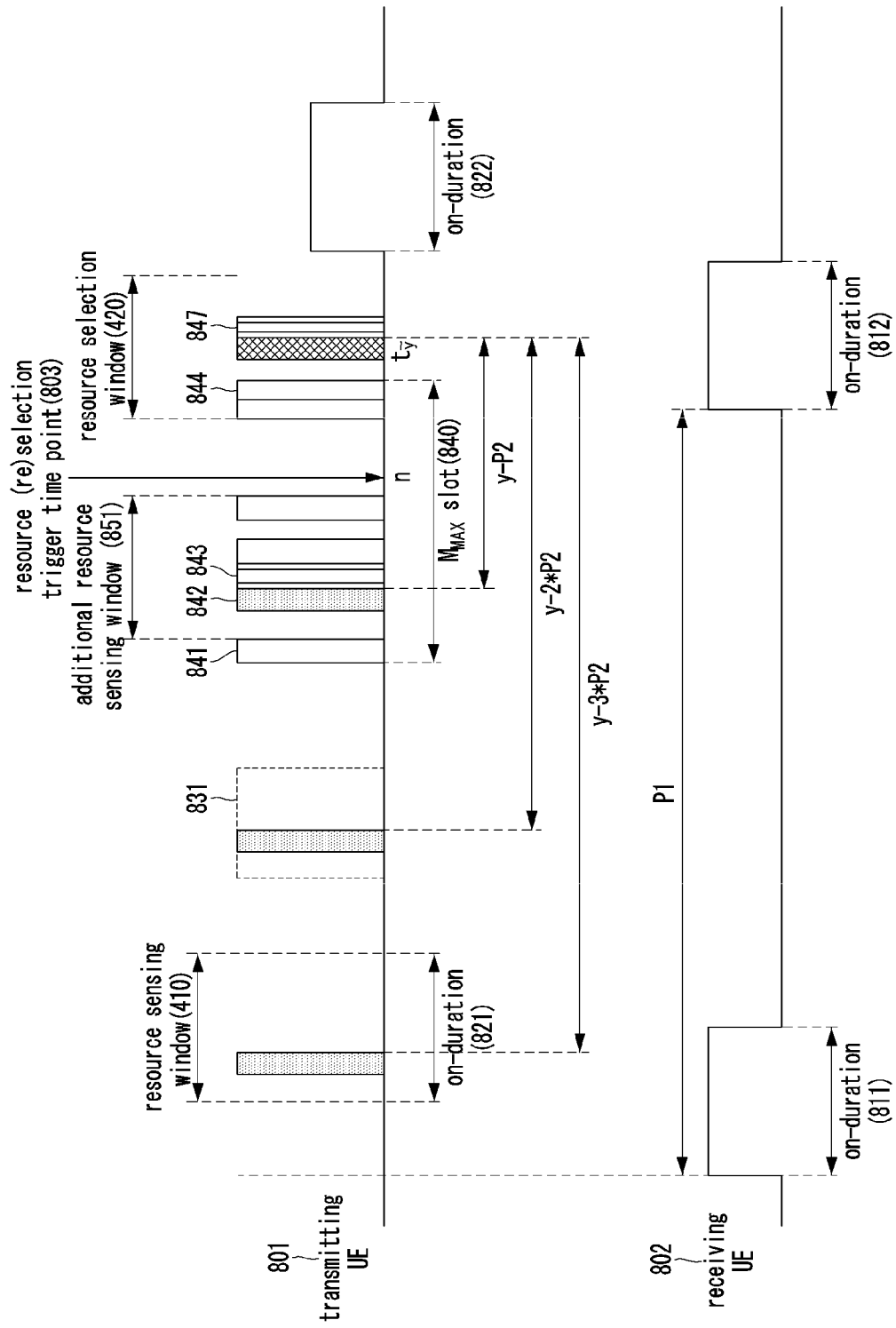
FIG. 8 is an exemplary diagram for describing a time point at which additional sensing is performed in a DRX inactive time of a terminal according to an exemplary embodiment of the present disclosure.

FIG. 8 is an exemplary diagram for describing a time point at which additional sensing is performed in a DRX inactive time of a terminal according to an exemplary embodiment of the present disclosure.

Referring to FIG. 8, a transmitting terminal (i.e., UE) 801 and a receiving UE 802 are illustrated. The transmitting UE 801 and/or the receiving UE 802 may include at least some of the configurations described above with reference to FIG. 2, and may perform operations described below.

The receiving UE 802 may provide the transmitting UE 801 with information on on-duration periods 811 and 812 of the receiving UE 802. Accordingly, the transmitting UE 801 may receive the information on the on-duration periods 811 and 812 of the receiving UE 802. The transmitting UE 801 may be a UE performing sidelink DRX operations. Therefore, both the transmitting UE 801 and the receiving UE 802 may be in a state performing sidelink DRX operations.

The transmitting UE 801 may determine candidate resources to be used for transmission by activating the resource sensing window 410 in the on-duration periods 821 and 822, respectively. Since the above-described methods may be used to determine such the candidate resources, redundant descriptions will be omitted.

The transmitting UE 801 may determine a candidate resource to be used for transmission based on the resource sensing window 410 in the first on-duration period 821. The resource sensing window 410 may have a length equal to or smaller than the first on-duration period 821. FIG. 8 exemplifies a case in which the first on-duration period 821 and the resource sensing window 410 have the same length. A reference numeral 831 of FIG. 8 may indicate an omitted resource sensing window. This exemplifies a case where resource sensing is omitted because the transmitting UE 801 operates in the sidelink DRX state.

The transmitting UE 801 according to the present disclosure may configure $M_{max}$ logical slots closest to the on-duration period of the receiving UE 802 provided by the receiving UE 802 as a maximum additional resource sensing window 840. In this case, the value of $M_{max}$ may be set (in advance) by the higher layer, and the higher layer may periodically update it in consideration of a power state of the terminal.

[Method 4]

When the transmitting UE 801 does not receive assistant information including preferred/non-preferred resources for resource sensing and selection from the receiving UE 802 before the maximum additional resource sensing window 840, the transmitting UE 801 may determine slots on which additional partial sensing is to be performed within the maximum additional sensing window in consideration of the resource selection window 420 autonomously (or according to implementation). In the disclosure, the assistant information may mean inter-UE coordination information. Specifically, in the example of FIG. 8, consecutive slots of the same size as the resource sensing window 410, among the slots 841, 842, 843, . . . , and 844 included in the maximum additional resource sensing window 840, may be configured as the additional resource sensing window.

[Method 5]

The transmitting UE 801 may receive assistant information including preferred/non-preferred resources for resource sensing and selection from the receiving UE 802 before the maximum additional resource sensing window 840. For example, the assistant information may be received through a MAC control element (CE) or second SCI. When the transmitting UE 801 receiving the assistant information performs periodic-based partial sensing, the resource sensing may be performed for slots $t_{y-k \cdot P_{rsvp}}$ (k=1, 2, . . . ) located within the maximum additional sensing window 840. Here, the slot $t_y$ may be a reference slot for configuring the maximum additional sensing window 840, and $P_{rsvp}$ may be a value indicating a resource reservation interval. An additional resource sensing window 851 in FIG. 8 is an example, and may be configured to sense arbitrary slots within the maximum additional sensing window 840. The additional sensing window 851 may be configured to have the same size as the resource sensing window 410. In addition, in the example of FIG. 8, a case where $P_{rsvp}$ is set to $P_2$, and additional sensing is performed only for a slot 842 corresponding to k=1. That is, even when k is 2 or k is 3 illustrated in FIG. 8, the additional sensing window 851 may be configured as needed. In this case, the transmitting UE 801 may exclude the sensing slots $t_{\tilde{y}-k \cdot P_{rsvp}}$ (k=1, 2, . . . ) corresponding to the non-preferred resource $t_{\tilde{y}}$ informed by the receiving UE 802 during the additional sensing. In FIG. 8, the non-preferred resource 847 is exemplified so that they can be identified. Also slot 843 is a sensing slot $t_{\tilde{y}-P_2}$ for non-preferred resource $t_{\tilde{y}}$.

In FIG. 8, the additional sensing window 851 exemplifies a form that does not overlap with the on-duration section 812 of the receiving terminal. However, since the additional sensing window 851 is determined within the maximum additional resource sensing window 840, it may overlap with a part of the on duration 812 period of the receiving terminal.

Hereinafter, Methods 6 and 7 will be described with reference to FIG. 9.

Figure 9:
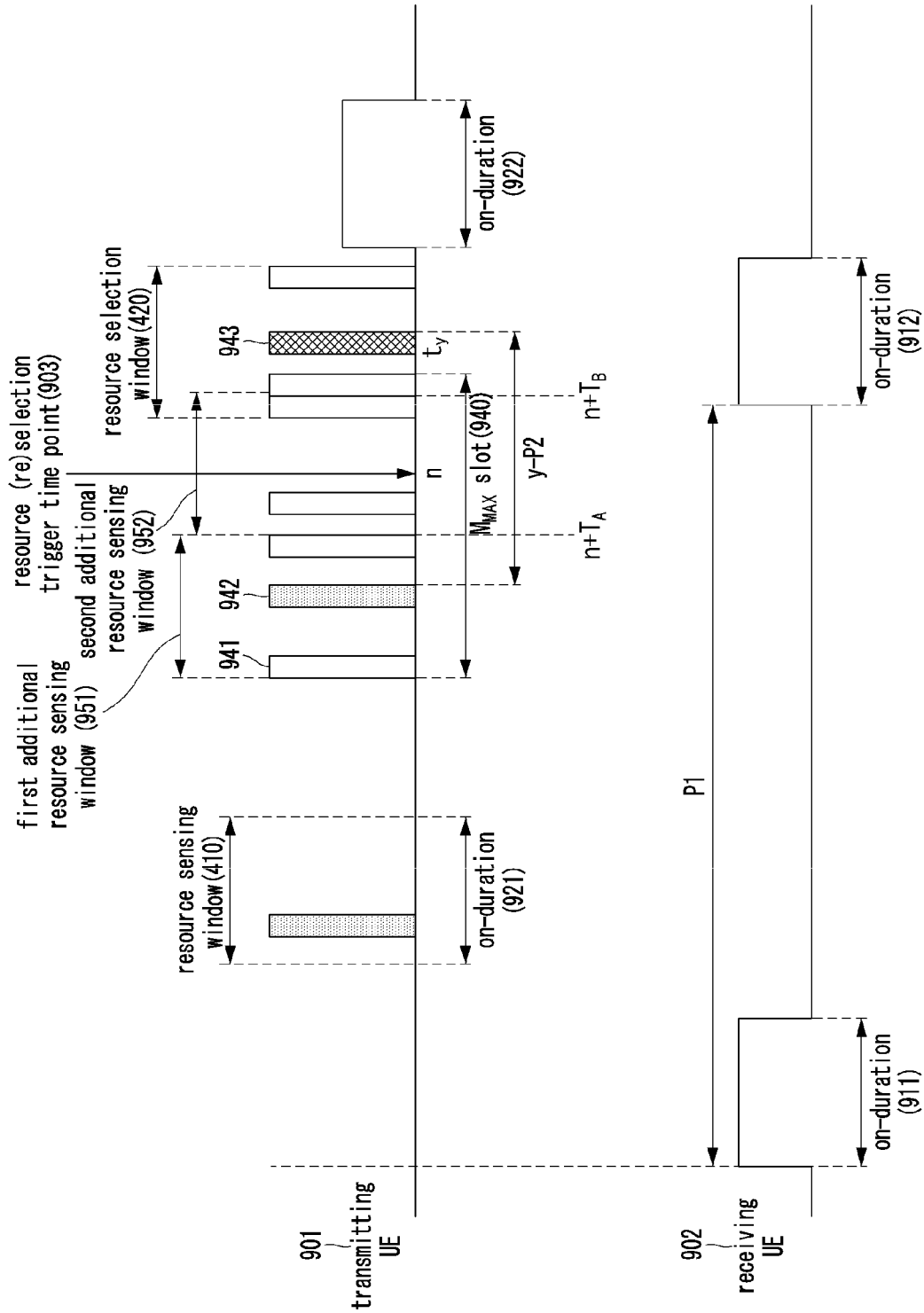
FIG. 9 is another exemplary diagram for describing a time point at which additional sensing is performed in a DRX inactive time of a terminal according to an exemplary embodiment of the present disclosure.

FIG. 9 is another exemplary diagram for describing a time point at which additional sensing is performed in a DRX inactive time of a terminal according to an exemplary embodiment of the present disclosure.

[Method 6]

Referring to FIG. 9, a transmitting UE 901 and a receiving UE 902 are illustrated. The transmitting UE 901 and/or the receiving UE 902 may include at least some of the configurations described above with reference to FIG. 2, and may perform operations described below.

The receiving UE 902 may provide the transmitting UE 901 with information on on-duration period 911 and 912 based on the sidelink DRX operations of the receiving UE 902. Accordingly, the transmitting UE 901 may receive the information on the on-duration periods 911 and 912 of the receiving UE 902. The transmitting UE 901 may be a UE performing sidelink DRX operations. As illustrated in FIG. 9, the first on-duration period 921 and the second on-duration period 922 may be configured according to a predetermined cycle. Accordingly, both the transmitting UE 901 and the receiving UE 902 may be in a state performing sidelink DRX operations.

The transmitting UE 901 may determine candidate resources to be used for transmission by activating the resource sensing window 410 in the on-duration periods 921 and 922, respectively. Since the above-described methods may be used to determine such the candidate resources, redundant descriptions will be omitted.

In addition, as described above with reference to FIG. 8, the transmitting UE 901 may receive assistant information including preferred/non-preferred resources for resource sensing and selection from the receiving UE 902 through a MAC CE or second SCI before the maximum additional resource sensing window 940.

The transmitting UE 901 having received the assistant information and having completed the periodic-based partial sensing may additionally perform contiguous partial sensing as described in FIG. 9, when the number of remaining candidate resources included in the resource set $S_A$ among the set of preferred resources informed by the receiving UE 902 is greater than $X \cdot M_{total}$. That is, as described with reference to FIG. 8, the first additional resource sensing window 951 may be the same window as the additional resource sensing window 851 described above with reference to FIG. 8. Accordingly, according to an exemplary embodiment of the present disclosure, the second additional resource sensing window 952 may be configured consecutively to the first additional resource sensing window 951.

On the other hand, if the number of candidate resources finally remaining in the set $S_A$ after the contiguous partial sensing operation is smaller than $X \cdot M_{total}$, the number of candidate resources remaining in the set $S_A$ may be configured to be greater than $X \cdot M_{total}$ by re-including the candidate resource excluded first.

[Method 7]

The contiguous partial sensing windows 951 and 952 in the above-described Method 6 may be configured to overlap the periodic-based partial sensing window according to configuration of the higher layer. When there is not configuration of the higher layer, a start time $n+T_A$ of the continuous partial sensing window may be configured as an end time of the last periodic-based partial sensing window, as illustrated in FIG. 9.

Increasing the PRR performance by obtaining an accurate sensing result through the additional partial sensing is important as a priority of data (i.e., transport block (TB)) to be transmitted by the transmitting UE is higher. On the other hand, if the priority is low, it is also necessary to stop additional sensing operations to reduce power consumption. Hereinafter, the additional sensing operation based on a priority will be described.

[Method 8]

The transmitting UE may determine whether to perform the additional partial sensing operation using the methods described above according to priority information of data to be transmitted received from the higher layer. In addition, the transmitting UE may determine whether additional partial sensing is performed according to the priority information of data to be transmitted, as well as whether to stop the additional sensing operation being performed. If the priority value (i.e., $prio_{TX}$) of the data to be transmitted is greater than a pre-configured priority value (i.e., $prio_{pre1}$), that is, if the priority of the data to be transmitted is lower than a pre-configured priority, the terminal may not additional partial sensing immediately or after a certain time, or may stop the sensing operation being performed.

[Method 9]

If the priority value ($prio_{TX}$) of the data to be transmitted received from the higher layer is smaller than a pre-configured priority value (i.e., $prio_{pre2}$), that is, if the priority of the data to be transmitted is higher than a pre-configured priority, the transmitting UE may include a resource corresponding to the SL DRX inactive time of the receiving UE in the set $S_A$ in the additional partial sensing operation. In this case, if the receiving UE notifies the non-preferred resource set within the SL DRX inactive time in advance, it may be excluded from sensing as described above.

[Method 10]

The transmitting UE may request the receiving UE to report non-preferred resources within the inactive time or within the inactive time and the active time. This will be described with reference to the attached FIG. 10.

Figure 10:
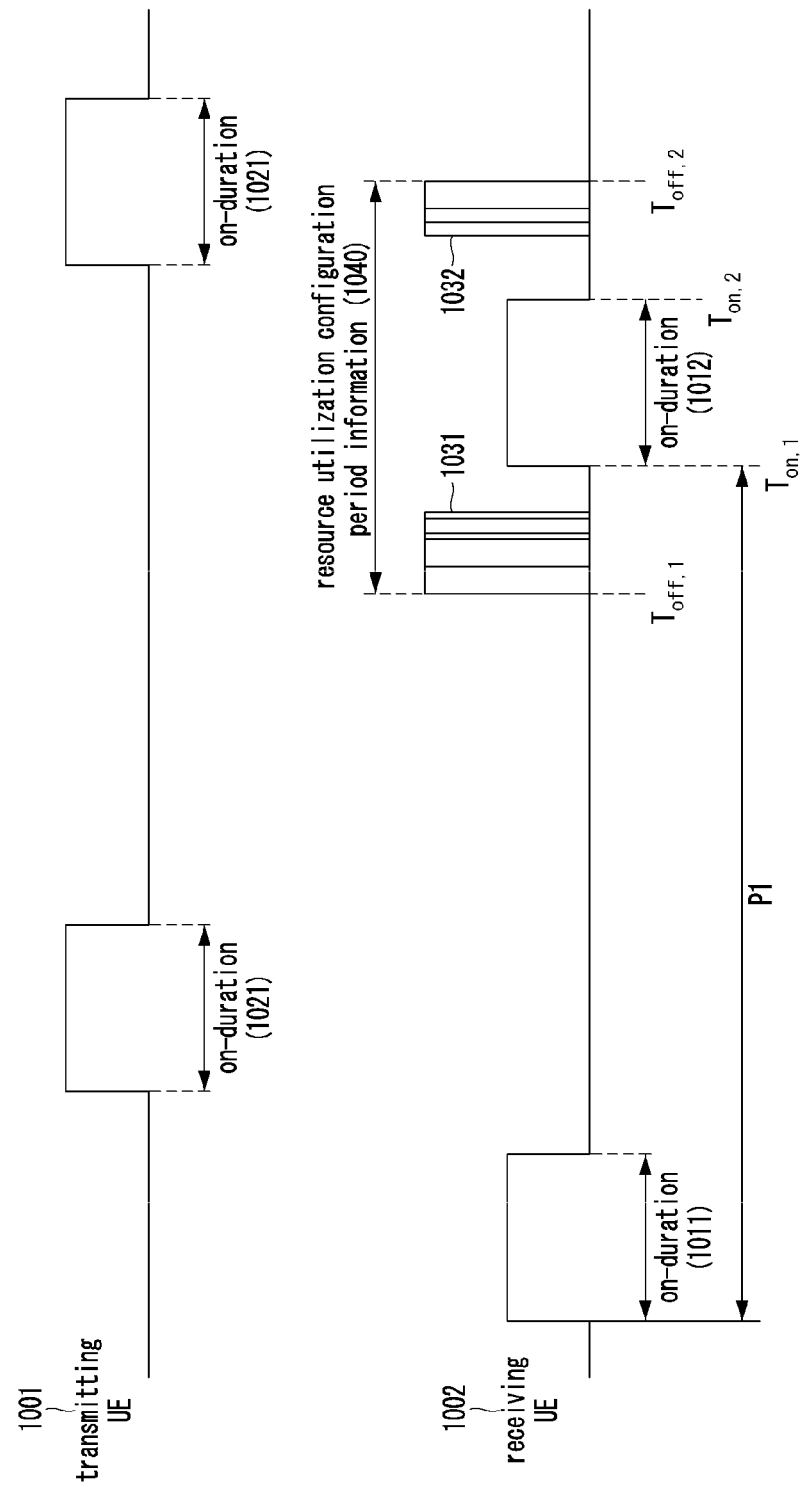
FIG. 10 is an exemplary diagram for describing non-preferred resources of a sidelink DRX receiving terminal according to an exemplary embodiment of the present disclosure.

FIG. 10 is an exemplary diagram for describing non-preferred resources of a sidelink DRX receiving terminal according to an exemplary embodiment of the present disclosure.

Referring to FIG. 10, a transmitting UE 1001 and a receiving UE 1002 are illustrated. The transmitting UE 1001 and/or the receiving UE 1002 may include at least some of the configurations described above with reference to FIG. 2, and may perform operations described below.

As described above with reference to FIG. 9, the receiving UE 1002 may provide the transmitting UE 1001 with information on on-duration periods 1011 and 1012 based on the sidelink DRX operations of the receiving UE 1002. Accordingly, the transmitting UE 1001 may receive the information on the on-duration periods 1011 and 1012 of the receiving UE 1002. The transmitting UE 1001 may be a UE performing sidelink DRX operations. As illustrated in FIG. 10, the transmitting UE 1001 may configure the first on-duration period 921 and the second on-duration period 922 according to a predetermined cycle. Therefore, both the transmitting UE 1001 and the receiving UE 1002 may be in a state performing sidelink DRX operations.

In addition, the transmitting UE 1001 according to the present disclosure may provide resource utilization configuration period information 1040 including inactive resources of the receiving UE 1002 in advance. Referring to FIG. 10, a case in which the transmitting UE 1001 provides $T_{off,1}$ and $T_{off,2}$ as the resource utilization configuration period information 1040 for the receiving UE 1002 is exemplified.

Accordingly, the receiving UE 1002 may receive $T_{off,1}$ and $T_{off,2}$ as the resource utilization configuration period information 1040. The receiving UE 1002 may determine non-preferred resources in a period configured by the resource utilization configuration period information 1040. The example of FIG. 10 exemplifies a case in which non-preferred resources 1031 and 1032 are selected within the inactive time. The non-preferred resources 1031 and 1032 may be resources within the active time, i.e., on-duration period 1012, or may be resources included in the off-duration as illustrated in FIG. 10.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for sidelink discontinuous reception (DRX) communication, performed by a transmitting terminal, the method comprising:
   configuring a first resource sensing window for identifying whether resources of a candidate resource set to be used for sidelink DRX communication are reserved or used;
   identifying whether the resources of the candidate resource set are reserved or used based on the first resource sensing window;
   determining a selected resource set based on a result of the identification;
   configuring a second resource sensing window for identifying whether resources of the selected resource set to be used for sidelink DRX communication are reserved or used, wherein the second resource sensing window is configured within a DRX inactive time based on information on a DRX active time of a receiving terminal, which is received from the receiving terminal;
   identifying whether the resources of the candidate resource set are reserved or used by another terminal based on the second resource sensing window;
   updating the selected resource set based on a result of the identification on the second resource sensing window; and
   transmitting data to the receiving terminal by using a resource of the updated selected resource set.

2. The method according to claim 1, wherein the identifying of whether the resources of the candidate resource set are reserved or used by another terminal comprises:
   receiving signals transmitted through each resource of the first resource sensing window or the second resource sensing window;
   measuring a reference signal received power (RSRP) for each of the received signals; and
   determining a resource in which the measured RSRP is greater than or equal to a pre-configured threshold as a resource used by another terminal.

3. The method according to claim 1, wherein the configuring of the second resource sensing window comprises:
   determining a predetermined number of resources as a maximum additional resource sensing window in the DRX inactive time of the transmitting terminal; and
   configuring the second resource sensing window so as to sense arbitrary resources within the maximum additional resource sensing window.

4. The method according to claim 3, wherein a size of the second resource sensing window is determined based on a power state of the transmitting terminal.

5. The method according to claim 1, wherein, when assistant information on a non-preferred resource is received from the receiving terminal, a sensing operation is not performed in a position within the second resource sensing window associated with the non-preferred resource,
   wherein the assistant information is received through a media access control (MAC) control element (CE) or sidelink control information (SCI).

6. The method according to claim 1, further comprising:
   when the determined selected resource set has resources less than a pre-configured number, identifying whether the resources of the candidate resource set are reserved or used based on at least one of the first resource sensing window or the second resource sensing window until a number of resources determined by using one of two or more pre-configured threshold values is satisfied.

7. The method according to claim 1, further comprising:
   stopping the configuring of the second resource sensing window when a priority of transmission of the data, which is received from a higher layer, is lower than a pre-configured priority; and
   transmitting the data based on the selected resource set.

8. The method according to claim 1, further comprising:
   when a priority of transmission of the data, which is received from a higher layer, is higher than a pre-configured priority, configuring the second resource sensing window within the DRX inactive time of the transmitting terminal.

9. The method according to claim 8, further comprising:
   requesting a report on a non-preferred resource of the DRX active time of the receiving terminal;
   receiving information on the non-preferred resource of the DRX active time of the receiving terminal; and
   excluding the non-preferred resource of the DRX active time of the receiving terminal when updating the selected resource set.

10. A user equipment (UE) for sidelink communication, comprising:
    a processor; and
    a transceiver for communicating with at least one terminal,
    wherein the processor is executed to perform:
      configuring a first resource sensing window for identifying whether resources of a candidate resource set to be used for sidelink DRX communication are reserved or used;
      identifying whether the resources of the candidate resource set are reserved or used based on the first resource sensing window through the transceiver;
      determining a selected resource set based on a result of the identification;

configuring a second resource sensing window for identifying whether resources of the selected resource set to be used for sidelink DRX communication are reserved or used, wherein the second resource sensing window is configured within a DRX inactive time based on information on a DRX active time of a receiving terminal, which is received from the receiving terminal;

identifying whether the resources of the candidate resource set are reserved or used by another terminal based on the second resource sensing window through the transceiver;

updating the selected resource set based on a result of the identification on the second resource sensing window; and transmitting data to the receiving terminal through the transceiver by using a resource of the updated selected resource set.

11. The UE according to claim 10, wherein the processor is further executed to perform:

receiving signals transmitted in each resource of the first resource sensing window or the second resource sensing window through the transceiver;

measuring a reference signal received power (RSRP) for each of the received signals through the transceiver; and determining a resource in which the measured RSRP is greater than or equal to a pre-configured threshold as a resource used by another terminal.

12. The UE according to claim 10, wherein in the configuring of the second resource sensing window, the processor is further executed to perform:

determining a predetermined number of resources as a maximum additional resource sensing window in the DRX inactive time of the transmitting terminal; and configuring the second resource sensing window so as to sense arbitrary resources within the maximum additional resource sensing window.

13. The UE according to claim 12, wherein a size of the second resource sensing window is determined based on a power state of the transmitting terminal.

14. The UE according to claim 10, wherein, when assistant information on a non-preferred resource is received from the receiving terminal, a sensing operation is not performed in a position within the second resource sensing window associated with the non-preferred resource, wherein the assistant information is received through a media access control (MAC) control element (CE) or sidelink control information (SCI).

15. The UE according to claim 10, wherein the processor is further executed to perform: when the determined selected resource set has resources less than a pre-configured number, identifying whether the resources of the candidate resource set are reserved or used based on at least one of the first resource sensing window or the second resource sensing window until a number of resources determined by using one of two or more pre-configured threshold values is satisfied.

16. The UE according to claim 10, wherein the processor is further executed to perform:

stopping the configuring of the second resource sensing window when a priority of transmission of the data, which is received from a higher layer, is lower than a pre-configured priority; and transmitting the data based on the selected resource set.

17. The UE according to claim 10, wherein the processor is further executed to perform: when a priority of transmission of the data, which is received from a higher layer, is higher than a pre-configured priority, configuring the second resource sensing window within the DRX inactive time of the transmitting terminal.

18. The UE according to claim 17, wherein the processor is further executed to perform:

requesting a report on a non-preferred resource of the DRX active time of the receiving terminal;

receiving information on the non-preferred resource of the DRX active time of the receiving terminal; and excluding the non-preferred resource of the DRX active time of the receiving terminal when updating the selected resource set.

19. A method for sidelink discontinuous reception (DRX) communication, performed by a receiving terminal, the method comprising:

receiving, from a transmitting terminal, a request message for requesting a report on a non-preferred resource within a DRX inactive time or within the DRX inactive time and a DRX active time;

identifying the non-preferred resource within the DRX inactive time or within the DRX inactive time and the DRX active time, from a response to the request message; and transmitting, to the transmitting terminal, information on the identified non-preferred resource within the DRX inactive time or the identified non-preferred resource within the DRX inactive time and the DRX active time.

20. The terminal according to claim 19, wherein the request message includes information on a start time and an end time of the DRX inactive time.

* * * * *